United States Patent
Kostic et al.

(10) Patent No.: US 11,246,777 B2
(45) Date of Patent: *Feb. 15, 2022

(54) HAPTIC SYSTEMS AND METHODS FOR A USER INTERFACE OF A PATIENT SUPPORT APPARATUS

(71) Applicant: Stryker Corporation, Kalamazoo, MI (US)

(72) Inventors: Marko N. Kostic, Johnson City, TN (US); Aaron Douglas Furman, Kalamazoo, MI (US); Annie Desaulniers, Bothell, WA (US); Richard A. Derenne, Portage, MI (US); Marco Constant, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/922,303

(22) Filed: Jul. 7, 2020

(65) Prior Publication Data
US 2020/0330303 A1    Oct. 22, 2020

Related U.S. Application Data

(63) Continuation of application No. 15/833,427, filed on Dec. 6, 2017, now Pat. No. 10,744,053.

(Continued)

(51) Int. Cl.
*A61G 7/05* (2006.01)
*G06F 3/01* (2006.01)
(Continued)

(52) U.S. Cl.
CPC ............ *A61G 7/0524* (2016.11); *A61G 7/012* (2013.01); *A61G 7/015* (2013.01); *A61G 7/018* (2013.01);
(Continued)

(58) Field of Classification Search
CPC ...... A61G 7/0524; A61G 7/015; A61G 7/018; A61G 7/012; A61G 7/0506; A61G 7/0509;
(Continued)

(56) References Cited

U.S. PATENT DOCUMENTS 4,225,988 A    10/1980   Cary et al.
4,375,706 A     3/1983   Finnhult
(Continued)

FOREIGN PATENT DOCUMENTS

CA     2696686 A1   4/2009
DE     8304560 U1   6/1983
(Continued)

OTHER PUBLICATIONS

Aito, "Haptic-Touch Technology Video", https://aito-touch.com/technology/haptic-touch/, Jul. 2017.
(Continued)

*Primary Examiner* — David R Hare
(74) *Attorney, Agent, or Firm* — Howard & Howard Attorneys PLLC

(57) ABSTRACT

A patient support apparatus comprises a patient support surface for patients. The patient support apparatus comprises a user input device, a controller, and an ultrasonic generator system. The controller is configured to control the ultrasonic generator system to provide haptic sensations to the user. The haptic sensations, in some cases, provides tactile stimuli to a user associated with a virtual button.

17 Claims, 10 Drawing Sheets

Related U.S. Application Data

(60) Provisional application No. 62/431,126, filed on Dec. 7, 2016.

(51) Int. Cl.
| | |
|---|---|
| *A61G 7/015* | (2006.01) |
| *A61G 7/018* | (2006.01) |
| *A61G 7/012* | (2006.01) |
| *G06F 3/0481* | (2013.01) |
| *G06F 3/0488* | (2013.01) |

(52) U.S. Cl.
CPC ......... *A61G 7/0506* (2013.01); *A61G 7/0509* (2016.11); *G06F 3/016* (2013.01); *G06F 3/04817* (2013.01); *A61G 2203/16* (2013.01); *A61G 2203/20* (2013.01); *G06F 3/0488* (2013.01)

(58) Field of Classification Search
CPC .............. A61G 2203/20; A61G 2203/16; G06F 3/016; G06F 3/04817; G06F 3/0488; G06F 3/04886; G06F 2203/04809
See application file for complete search history.

(56) References Cited

U.S. PATENT DOCUMENTS

| | | | |
|---|---|---|---|
| 5,224,228 A | 7/1993 | Larrimore | |
| 5,513,406 A | 5/1996 | Foster et al. | |
| 5,535,464 A | 7/1996 | Salonica | |
| 5,806,115 A | 9/1998 | Brown | |
| 5,826,286 A | 10/1998 | Cranston | |
| 6,276,012 B2 | 8/2001 | Borders | |
| 6,654,974 B2 | 12/2003 | Ruehl et al. | |
| 7,148,875 B2 | 12/2006 | Rosenberg et al. | |
| 7,246,389 B2 | 7/2007 | Taguchi et al. | |
| 7,716,762 B2 | 5/2010 | Ferraresi et al. | |
| 7,761,942 B2 | 7/2010 | Benzo et al. | |
| 7,886,379 B2 | 2/2011 | Benzo et al. | |
| 7,888,901 B2 | 2/2011 | Larson et al. | |
| 8,141,947 B2 | 3/2012 | Nathan et al. | |
| 8,605,053 B2 | 12/2013 | Murphy et al. | |
| 8,689,376 B2 | 4/2014 | Becker et al. | |
| 8,826,475 B2 | 9/2014 | Jackson | |
| 8,896,524 B2 | 11/2014 | Birnbaum et al. | |
| 9,216,123 B2 | 12/2015 | Tekulve | |
| 10,449,101 B2 | 10/2019 | Brosnan et al. | |
| 10,744,053 B2 * | 8/2020 | Kostic | G06F 3/016 |
| 2003/0115672 A1 | 6/2003 | Newkirk | |
| 2005/0160530 A1 | 7/2005 | Taguchi et al. | |
| 2006/0077186 A1 | 4/2006 | Park et al. | |
| 2008/0003797 A1 | 1/2008 | Kim | |
| 2008/0172789 A1 | 7/2008 | Elliot et al. | |
| 2008/0303797 A1 | 12/2008 | Grothe | |
| 2009/0094745 A1 | 4/2009 | Benzo et al. | |
| 2010/0295823 A1 | 11/2010 | Ahn et al. | |
| 2011/0199342 A1 | 8/2011 | Vartanian et al. | |
| 2012/0194483 A1 * | 8/2012 | Deluca | G06F 1/1643 345/177 |
| 2015/0077534 A1 | 3/2015 | Derenne et al. | |
| 2015/0135440 A1 | 5/2015 | Chiacchira | |
| 2016/0022039 A1 | 1/2016 | Paul et al. | |
| 2016/0287459 A1 | 10/2016 | Lemire et al. | |
| 2016/0296396 A1 | 10/2016 | Kolar et al. | |
| 2016/0349854 A1 * | 12/2016 | Hayes | A61G 7/05 |
| 2016/0354263 A1 | 12/2016 | Furman et al. | |
| 2017/0324020 A1 | 11/2017 | Riihiaho | |
| 2018/0369035 A1 * | 12/2018 | Bhimavarapu | A61G 7/018 |
| 2018/0369037 A1 * | 12/2018 | Desaulniers | A61G 7/018 |
| 2019/0021924 A1 | 1/2019 | Trepanier | |
| 2019/0083337 A1 * | 3/2019 | Tessmer | A61G 7/015 |

FOREIGN PATENT DOCUMENTS

| | | |
|---|---|---|
| EP | 0030035 A1 | 6/1981 |
| EP | 262771 A1 | 4/1988 |
| EP | 0363541 A1 | 4/1990 |
| EP | 2308441 A1 | 4/2011 |
| GB | 2345439 A | 7/2000 |
| WO | 2014128640 A2 | 8/2014 |
| WO | 2017212027 A1 | 12/2017 |

OTHER PUBLICATIONS

Aito, "Haptic-Touch Webpage", www.aito-touch.com/technology, Jul. 2017, 7 pages.
Apple, "How to Use the Home Button on Iphone 7 and Iphone 8", www.support.apple.com/en-us/HT207188,2017, 2 pages.
BMW, "AirTouch in BMW's Touchless Dashboard Concept—CES 2016", https://www.youtube.com/watch?v=GvhUK5gLc-c, Jan. 8, 2016, 1 page.
English language abstract and machine-assisted English translation for DE 83 04 560 extracted from espacenet.com database on May 10, 2018, 16 pages.
Hill-Rom, "The Hill-Rom 900 Accella Bed Brochure", 2017, 16 pages.
Iwamoto et al., "Two Dimensional Radiation Pressure Tactile Display", SICE Annual Conference, Okayama University, Japan, Aug. 8-10, 2005, pp. 1298-1301.
Iwamoto et al., A Tactile Display Using Ultrasound Linear Phased Array, The Fourteenth International Conference on Artificial Reality and Telexistence (ICAT2004), 2004, 6 pages.
Kim et al., "SaLT: Small and Lightweight Tactile Display Using Ultrasonic Actuators", Proceedings of the 17th IEEE International Symposium on Robot and Human Interactive Communicatoin Techische Universitat Muchen, Germany, Aug. 1-3, 2008, pp. 430-435.
Machine-assisted English language abstract for EP 0 030 035 extracted from espacenet.com database on May 10, 2018, 1 page.
Stryker, "TrueRize Clinical Chair", Mkt Lit-1225, Nov. 16, 2015, Rev A.2; 4 pages.
Vtech, "Vtech Touch and Learn Acivity Desk Deluxe Internative Learning System", www.toysrus.com, 2016, 6 pages.

* cited by examiner

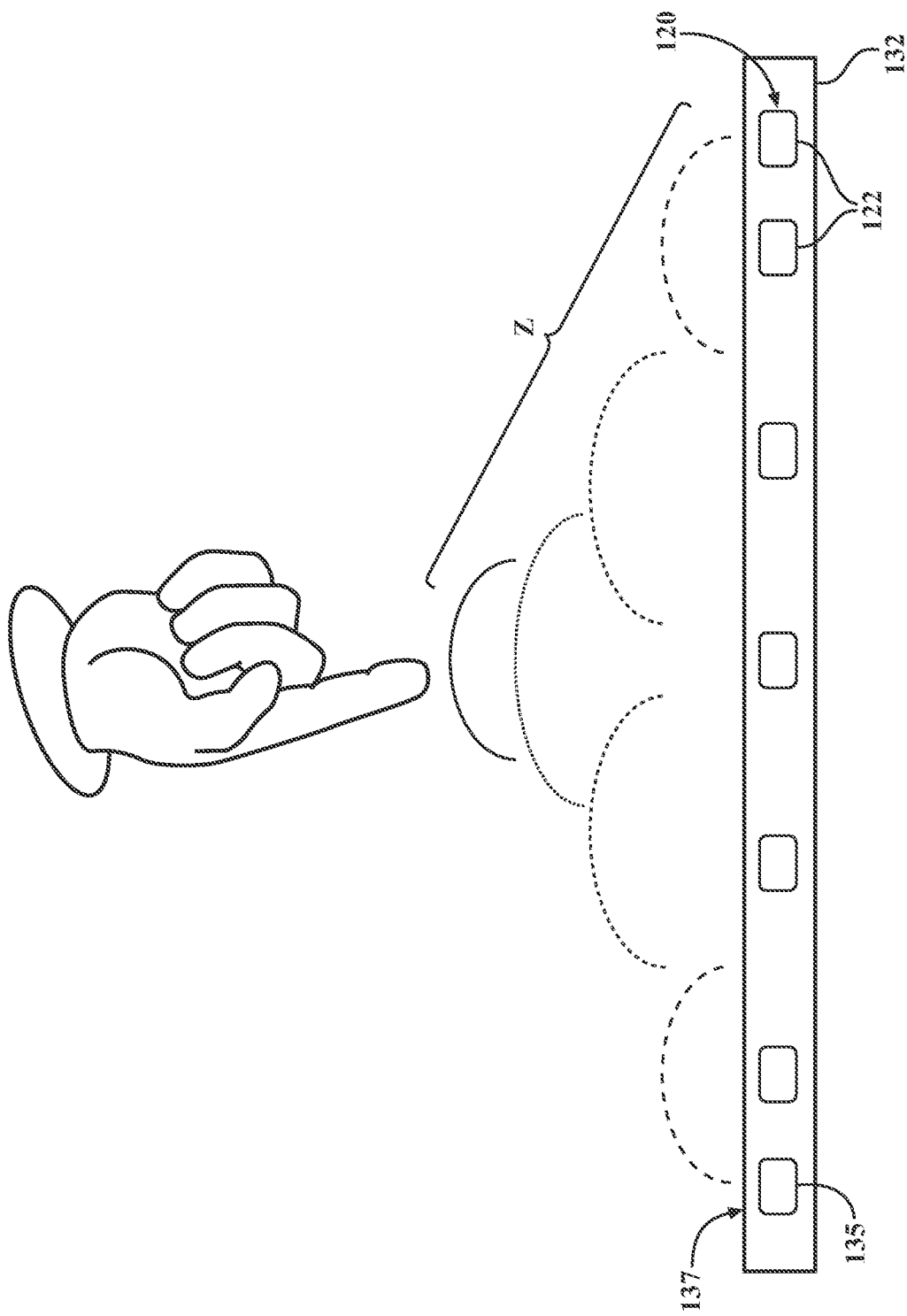

HAPTIC SYSTEMS AND METHODS FOR A USER INTERFACE OF A PATIENT SUPPORT APPARATUS

RELATED APPLICATIONS

This application is a continuation of U.S. patent application Ser. No. 15/833,427, filed on Dec. 6, 2017, which claims the benefit of and priority to U.S. Provisional Patent Application No. 62/431,126, filed on Dec. 7, 2016, the entire contents and disclosures of each of which are hereby incorporated by reference in their entirety.

BACKGROUND

Patient support apparatuses, such as hospital beds, stretchers, cots, tables, wheelchairs, and chairs facilitate care of patients in a health care setting. Conventional patient support apparatuses comprise a base and a patient support surface upon which the patient is supported. Often, these patient support apparatuses have one or more powered devices to perform one or more functions on the patient support apparatus. These functions can include lifting or lowering the patient support surface, extending or shortening a length of the patient support apparatus, extending or narrowing a width of the patient support apparatus, raising or lowering one or more deck sections, and the like. When a caregiver wishes to perform such a function, the caregiver actuates a user input device on a user interface, often in the form of a button on a control panel. Conventional user interfaces include separate modules (e.g., touchscreen displays) attached to one or more side rails, a headboard, and/or a footboard of the patient support apparatus and are generally difficult to clean due to the nature of the materials employed and seams/joints that are formed around the user interface. This can be particularly problematic as caregivers, patients, and other users are constantly touching the user interface to control the functions of the patient support apparatus. As a result, the user interface is especially susceptible to contamination by bacteria, viruses, and other microorganisms, which can lead to the spread of infections.

Additionally, the caregiver's attention is often required to first visually select an appropriate one out of multiple buttons on the user interface and then carefully actuate the appropriate button, usually while maintaining eye contact (i.e., line-of-sight) with the selected button. This can distract the caregiver's attention away from more meaningful tasks, such as watching or tending to the needs of the patient. In certain cases, the user interface also provides a display or other visual elements to display information to the caregiver, such as information that indicates to the caregiver current states of the patient support apparatus, e.g., a current height of the patient support surface, a current fowler angle, etc. While this information can be useful, it can further distract the caregiver from watching or tending to the needs of the patient.

A patient support apparatus designed to address one or more of the aforementioned challenges is desired.

BRIEF DESCRIPTION OF THE DRAWINGS

FIG. 4 is an illustration of a haptic sensation zone.

DETAILED DESCRIPTION

Figure 1:
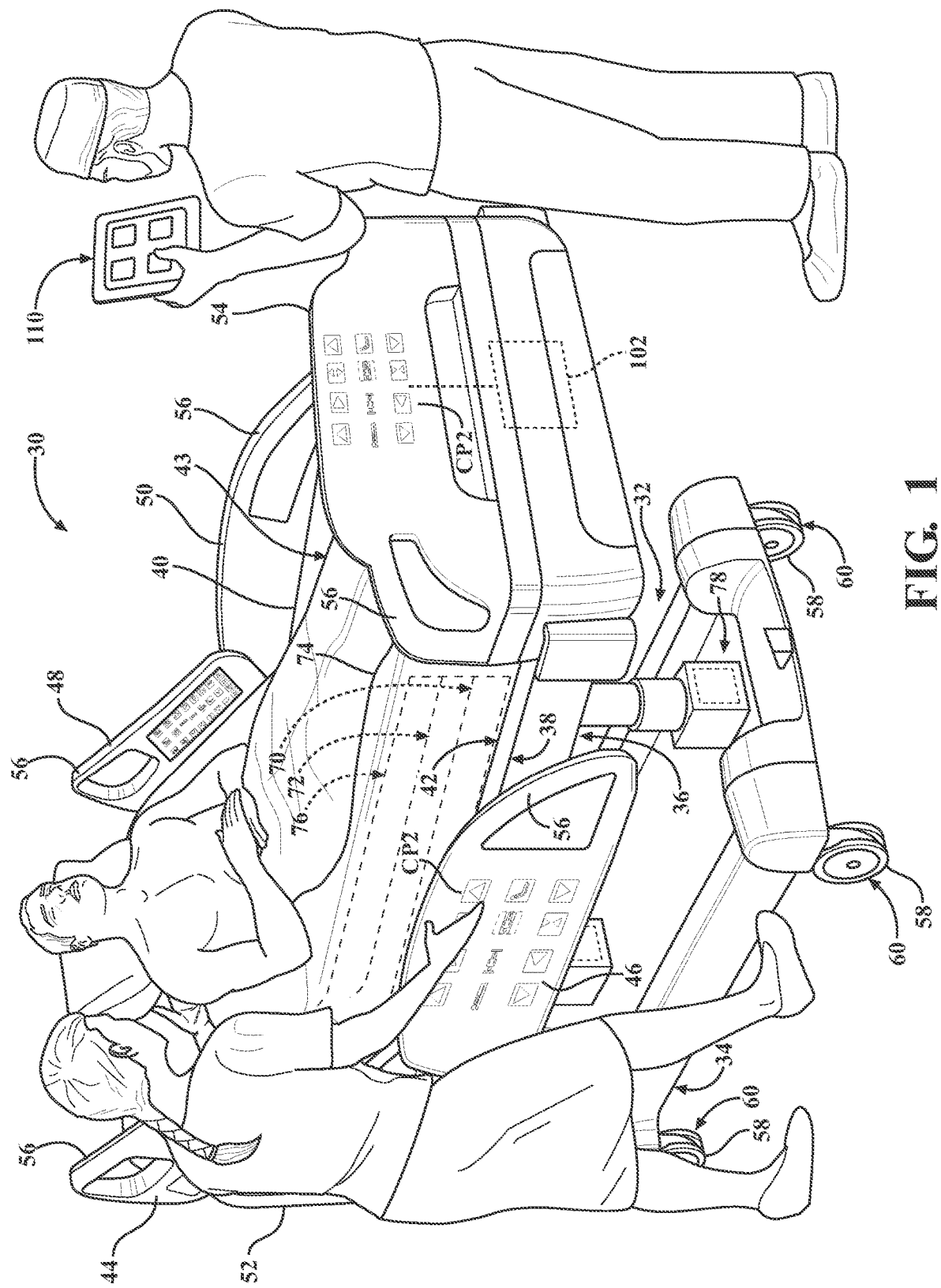
FIG. 1 is perspective view of a patient support apparatus.

Referring to FIG. 1, a patient support system comprising a patient support apparatus 30 is shown for supporting a patient in a health care setting. The patient support apparatus 30 illustrated in FIG. 1 comprises a hospital bed. In other embodiments, however, the patient support apparatus 30 may comprise a stretcher, cot, table, wheelchair, chair, or similar apparatus utilized in the care of a patient.

A support structure 32 provides support for the patient. The support structure 32 illustrated in FIG. 1 comprises a base 34 and an intermediate frame 36. The intermediate frame 36 is spaced above the base 34. The support structure 32 also comprises a patient support deck 38 disposed on the intermediate frame 36. The patient support deck 38 comprises several sections, some of which are capable of articulating (e.g., pivoting) relative to the intermediate frame 36, such as a fowler section, a seat section, a thigh section, and a foot section. The patient support deck 38 provides a patient support surface 42 upon which the patient is supported.

A mattress 40 is disposed on the patient support deck 38. The mattress 40 comprises a secondary patient support surface 43 upon which the patient is supported. The base 34, intermediate frame 36, patient support deck 38, and patient support surfaces 42, 43 each have a head end and a foot end corresponding to designated placement of the patient's head and feet on the patient support apparatus 30. The construction of the support structure 32 may take on any known or conventional design, and is not limited to that specifically set forth above. In addition, the mattress 40 may be omitted in certain embodiments, such that the patient rests directly on the patient support surface 42.

Side rails 44, 46, 48, 50 are coupled to the intermediate frame 36 and thereby supported by the base 34. A first side rail 44 is positioned at a right head end of the intermediate frame 36. A second side rail 46 is positioned at a right foot end of the intermediate frame 36. A third side rail 48 is positioned at a left head end of the intermediate frame 36. A fourth side rail 50 is positioned at a left foot end of the intermediate frame 36. If the patient support apparatus 30 is a stretcher or a cot, there may be fewer side rails. The side rails 44, 46, 48, 50 are movable between a raised position in which they block ingress and egress into and out of the patient support apparatus 30, one or more intermediate positions, and a lowered position in which they are not an obstacle to such ingress and egress. In still other configurations, the patient support apparatus 30 may not include any side rails.

A headboard 52 and a footboard 54 are coupled to the intermediate frame 36. In other embodiments, when the headboard 52 and footboard 54 are included, the headboard 52 and footboard 54 may be coupled to other locations on the patient support apparatus 30, such as the base 34. In still other embodiments, the patient support apparatus 30 does not include the headboard 52 and/or the footboard 54.

Caregiver interfaces 56, such as handles, are shown integrated into the footboard 54 and side rails 44, 46, 48, 50 to facilitate movement of the patient support apparatus 30 over floor surfaces. Additional caregiver interfaces 56 may be integrated into the headboard 52 and/or other components of the patient support apparatus 30. The caregiver interfaces 56 are graspable by the caregiver to manipulate the patient support apparatus 30 for movement.

Other forms of the caregiver interface 56 are also contemplated. The caregiver interface may comprise one or more handles coupled to the intermediate frame 36. The caregiver interface may simply be a surface on the patient support apparatus 30 upon which the caregiver logically applies force to cause movement of the patient support apparatus 30 in one or more directions, also referred to as a push location. This may comprise one or more surfaces on the intermediate frame 36 or base 34. This could also comprise one or more surfaces on or adjacent to the headboard 52, footboard 54, and/or side rails 44, 46, 48, 50. In other embodiments, the caregiver interface may comprise separate handles for each hand of the caregiver. For example, the caregiver interface may comprise two handles.

Wheels 58 are coupled to the base 34 to facilitate transport over the floor surfaces. The wheels 58 are arranged in each of four quadrants of the base 34 adjacent to corners of the base 34. In the embodiment shown, the wheels 58 are caster wheels able to rotate and swivel relative to the support structure 32 during transport. Each of the wheels 58 forms part of a caster assembly 60. Each caster assembly 60 is mounted to the base 34. It should be understood that various configurations of the caster assemblies 60 are contemplated. In addition, in some embodiments, the wheels 58 are not caster wheels and may be non-steerable, steerable, non-powered, powered, or combinations thereof. Additional wheels are also contemplated. For example, the patient support apparatus 30 may comprise four non-powered, non-steerable wheels, along with one or more powered wheels. In some cases, the patient support apparatus 30 may not include any wheels.

In other embodiments, one or more auxiliary wheels (powered or non-powered), which are movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheel base of the patient support apparatus 30. A fifth wheel may also be arranged substantially in a center of the base 34.

Figure 2:
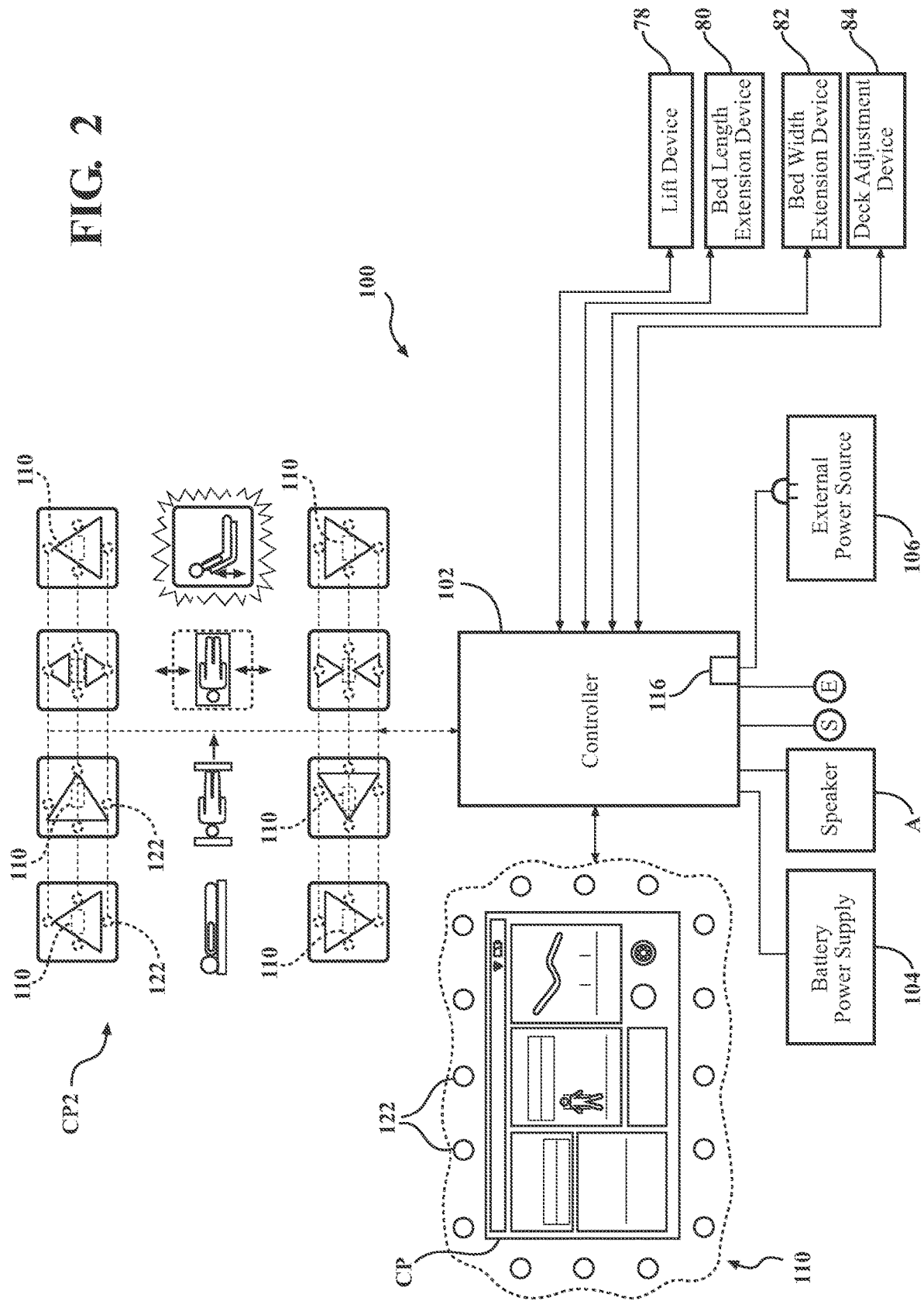
FIG. 2 is a schematic view of a control system.

Referring to FIG. 2, the patient support system may comprise one or more powered devices 78-84, each configured to perform one or more predetermined functions. The powered devices 78-84 utilize one or more components that require electricity. The powered devices 78-84 may comprise powered adjustment devices 78-84, such as a lift device 78, a bed length extension device 80, a bed width extension device 82, and a deck adjustment device 84. Other powered devices, such as powered wheels, and the like, are also contemplated. For instance, percussion devices, compression devices, vibration devices, and other patient therapy devices may also be employed.

A control system 100 is provided to control operation of the powered devices 78-84. The control system 100 comprises a controller 102 having one or more microprocessors for processing instructions or for processing an algorithm stored in memory 116 to control operation of the powered devices 78-84. Additionally or alternatively, the controller 102 may comprise one or more microcontrollers, field programmable gate arrays, systems on a chip, discrete circuitry, and/or other suitable hardware, software, or firmware that is capable of carrying out the functions described herein. The controller 102 may be carried on-board the patient support apparatus 30, or may be remotely located. In one embodiment, the controller 102 is mounted to the base 34. In other embodiments, the controller 102 is mounted to the footboard 54. The controller 102 may comprise one or more subcontrollers configured to control all the powered devices 78-84 or one or more subcontrollers for each of the powered devices 78-84. Power to the powered devices 78-84 and/or the controller 102 may be provided by a battery power supply 104 and/or an external power source 106.

The controller 102 is coupled to the powered devices 78-84 in a manner that allows the controller 102 to control the powered devices 78-84. The controller 102 may communicate with the powered devices 78-84 via wired or wireless connections. The controller 102 generates and transmits control signals to the powered devices 78-84, or components thereof, to operate their associated actuators, control their pumps, control their valves, or otherwise cause the powered devices 78-84 to perform one of more of the desired functions.

The controller 102 monitors a current state of the powered devices 78-84 and determines desired states in which the powered devices 78-84 should be placed, based on one or more input signals that the controller 102 receives from one or more user input devices 110. The state of the powered device 78-84 may be a position, a relative position, a pressure, an intensity, a frequency, an amplitude, a period, an angle, a speed, an energization status (e.g., on/off), or any other parameter of the powered device 78-84.

The caregiver, or other user, may actuate one of the user input devices 110, which transmits a corresponding input signal to the controller 102, and the controller 102 controls operation of the powered device 78-84 based on the input signal. Operation of the powered device 78-84 may continue until the caregiver discontinues actuation of the user input device 110, e.g., until the input signal is terminated. In other words, depending on which user input device 110 is engaged, i.e., what input signal is received by the controller 102, the controller 102 controls operation of one of the powered devices 78-84. In certain embodiments, the controller 102 selects or initiates operation of one of the powered devices 78-84 based on the input signals received by the controller 102. The user input devices 110 may be located on one of the side rails 44, 46, 48, 50, the headboard 52, the footboard 54, or other suitable locations. The user input devices 110 may also be located on a portable electronic device (e.g., iWatch®, iPhone®, iPad®, or similar electronic devices), as shown in FIG. 1.

Figure 3:
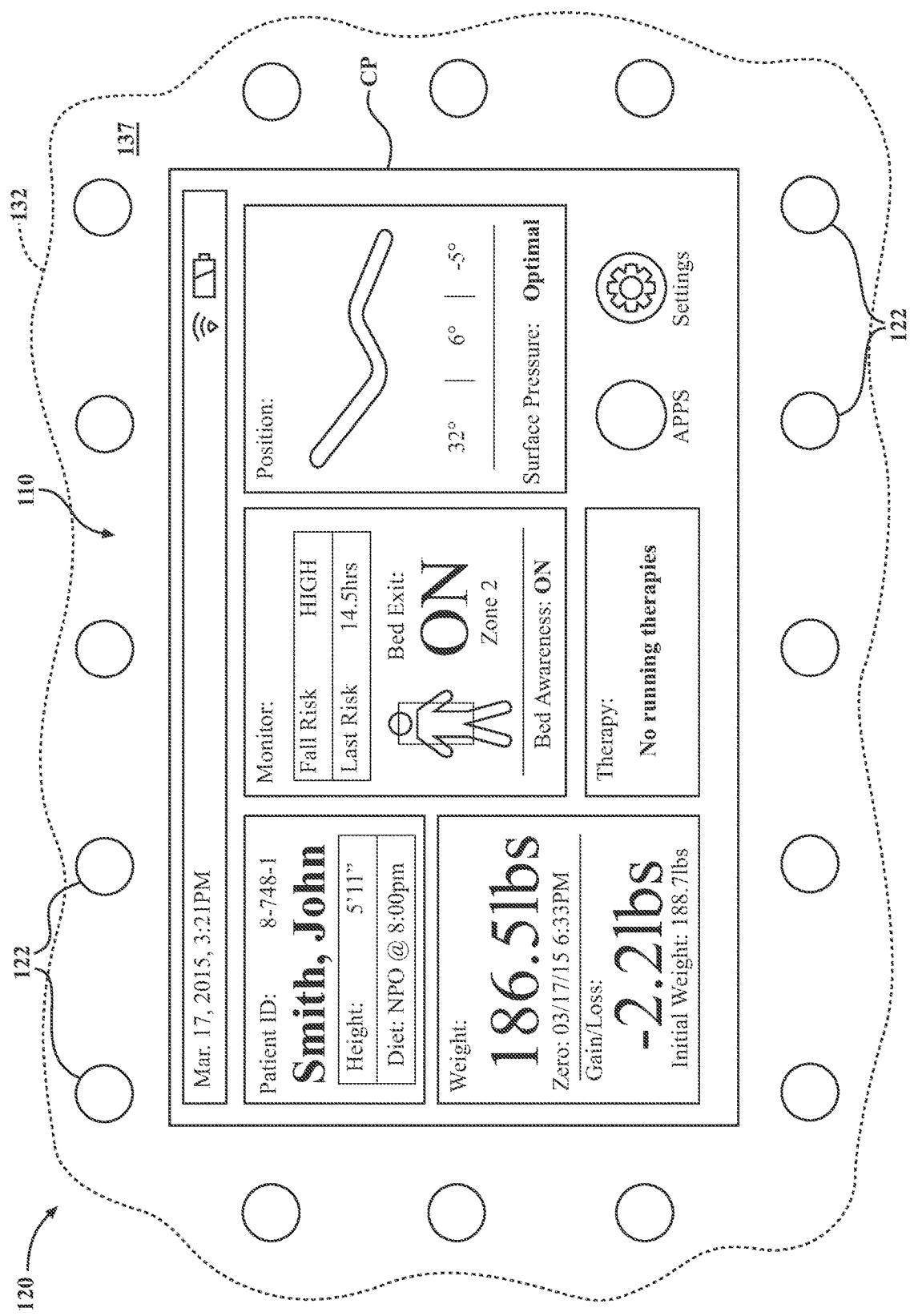
FIG. 3 is an illustration of a control panel.

In one embodiment shown in FIG. 3, the patient support apparatus 30 comprises a control panel CP having a user input device 110 in the form of a touchscreen to enable a user to control one or more functions of the patient support apparatus 30. The control panel CP may be integrated into one or more of the side rails 44, 46, 48, 50, headboard 52, footboard 54, or any other components of the patient support apparatus 30. The touchscreen of the control panel CP comprises a graphical user interface (GUI) to control the powered devices 78-84. The control panel CP may also comprise a display to display certain information as shown. As should be appreciated, the patient support apparatus 30 may comprise any number of powered devices 78-84 and corresponding user input devices 110.

A haptic generator cooperates with the control panel CP to provide haptic sensations (e.g., tactile stimuli) to a user of the control panel CP. In the embodiment shown in FIG. 3, the haptic generator comprises an ultrasonic generator system 120. The ultrasonic generator system 120 comprises an array of ultrasonic elements 122 (e.g., ultrasonic transducers and/or detectors). In the embodiment shown, the ultrasonic elements 122 are arranged about a periphery of the control panel CP and are embedded in a barrier wall 132. The barrier wall 132 is a wall of one of the side rails 44, 46, 48, 50, headboard 52, footboard 54, or other component of the patient support apparatus 30. In other embodiments, the ultrasonic elements 122 may be integrated into the control panel CP or elsewise located with respect to the control panel CP. The ultrasonic elements 122 may be hidden behind the barrier wall 132 or may be integrated elsewise into the barrier wall 132. In one embodiment, the ultrasonic elements 122 may be embedded in an ultrasonic layer (not shown) attached to the barrier wall 132. The ultrasonic layer may be more rigid than the barrier wall 132 or may be more flexible than the barrier wall 132.

The ultrasonic generator system 120 is arranged and controlled by the controller 102 to provide haptic sensations to the user. The haptic sensations may be associated with selectable items (e.g., icons) on the touchscreen so that the user feels a tactile sensation as the user's finger approaches the selectable items, but prior to actual contact with the touchscreen. The haptic sensations can be generated in a manner that provides a virtual button to the user so that, even though the touchscreen is flat and devoid of tactilely significant surfaces, the user is given the impression that a raised button actually exists. Such a virtual button can be created by ultrasound waves directed toward the user's finger that are felt by the user as the user's finger approaches the touchscreen—thereby creating tactile stimuli on the user's finger (see the graphical representation of ultrasound waves in FIG. 4). The haptic sensations can also be generated in a manner that conveys information to the user (also referred to as informational haptic feedback), such as patient conditions or alarm conditions, e.g., when the user has reached maximum or minimum limits of one or more of the powered devices, the ultrasound waves pulse, increase in intensity, decrease in intensity, etc. The controller 102 may provide the haptic sensations through texturizing. Texturizing involves providing controlled ultrasound via the ultrasonic generator system 120 to provide or simulate friction sensations, pulsing sensations, variable thickness sensations, coarseness sensations, irregularity sensations, movement sensations, bumpiness sensations, rigidness sensations, pliability sensations, and the like.

In some embodiments, ultrasound waves reach the user, and provide haptic sensations to the user, well before the user reaches any actual surface of the control panel CP. Accordingly, this can be referred to as contactless, haptic sensations. In some cases, such as when the haptic sensations are combined with user interfaces that have touchless/contactless input devices (e.g., gesture-based input, optical input, etc.), the combination of contactless haptic sensations and contactless user input reduces infections that may otherwise spread due to contact with the user interface. See, for example, U.S. Patent Application Publication No. 2015/0077534 to Derenne et al., entitled "Person Support Apparatuses With Virtual Control Panels," hereby incorporated by reference. See also, U.S. Patent Application Publication No 2011/0199342 to Vartanian et al., hereby incorporated by reference. When virtual control panels like those disclosed in these publications are employed along with the contactless haptic systems and methods described herein, direct infection transmission between the user and the patient support apparatus 30 can be reduced.

The ultrasonic elements 122 can be configured, arranged, and controlled as described in the following articles, all of which are hereby incorporated by reference herein: "Two Dimensional Radiation Pressure Tactile Display" by Iwamoto et al., pages 1298-1301, *SICE Annual Conference 2005 in Okayama*, Aug. 8-10, 2005 Okayama University, Japan, which discloses a method and system that can be used in the manner described herein to provide a two dimensional tactile display; "A Tactile Display Using Ultrasound Linear Phased Array" by Takayuki Iwamoto and Hiroyuki Shinoda, *The Fourteenth International Conference on Artificial Reality and Telexistence (ICAT2004)*, 2004 (referenced in the prior article), which discloses a tactile display that can be used in the manner described herein to provide tactile perception; or "SaLT: Small And Lightweight Tactile Display Using Ultrasonic Actuators" by Kim et al., pages 430-435, *Proceedings of the 17th IEEE International Symposium on Robot and Human Interactive Communication*, Technische Universitat Munchen, Germany, Aug. 1-3, 2008, which discloses ultrasonic actuators that can be used to provide a tactile display in the manner described herein to provide tactile perception.

The ultrasonic elements 122 can be controlled by the controller 102 to provide focal points of tactile stimuli. These focal points can be as small as 1 mm resulting in fine, precise tactile stimuli. The ultrasonic elements 122 can also provide focal points greater than 1 mm and can provide focal points at variable frequencies and intensities (e.g., through one or more ultrasonic linear phased arrays). The array of ultrasonic elements 122 may emit directional ultrasound waves (e.g., beams of waves) through air to desired locations above the barrier wall 132 in a sensation zone Z. The sensation zone Z is defined as a space (e.g., a volume), part of the space, or a force field above the barrier wall 132 that defines the range of ultrasound perception, as described in U.S. Patent Application Publication No 2011/0199342 to Vartanian et al., hereby incorporated by reference herein. Ultrasound may also be emitted from the ultrasonic elements 122 in various ultrasound patterns to create different sensations, as described in Vartanian et al.

The controller 102 is configured to control the intensity (e.g., strength) and/or direction of ultrasound emission. The controller 102 may control the ultrasonic elements 122 (e.g., one or more linear arrays of piezoelectric transducers) via an ultrasonic driving circuit, such as one comprising signal delay circuits implemented with 4-bit counters. In this case, control signals from the controller 102 to the ultrasonic elements 122 can be controlled so that ultrasound from each ultrasonic element 122 converge along one or more axes. The driving circuit (e.g., driver) may also be like that described and shown in FIG. 5 of "SaLT: Small And Lightweight Tactile Display Using Ultrasonic Actuators" by Kim et al., pages 430-435, *Proceedings of the 17th IEEE International Symposium on Robot and Human Interactive Communication*, Technische Universitat Munchen, Germany, Aug. 1-3, 2008, which is hereby incorporated herein by reference.

Ultrasound intensity and/or direction may be varied over time to provide different sensations to the user (e.g., the user's finger, hand, etc.). In one embodiment, as the user's finger pulls away from the barrier wall 132 or control panel CP, which is detected by some of the ultrasonic elements 122 (of the type that also detect soundwaves), intensity may be reduced by the controller 102. When the user's finger moves toward the barrier wall 132 or control panel CP, the intensity may be increased to create additional resistance.

Figure 6:
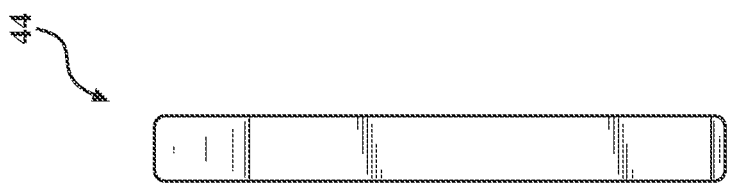
FIG. 6 is a right side elevational view of the side rail.
Figure 5:
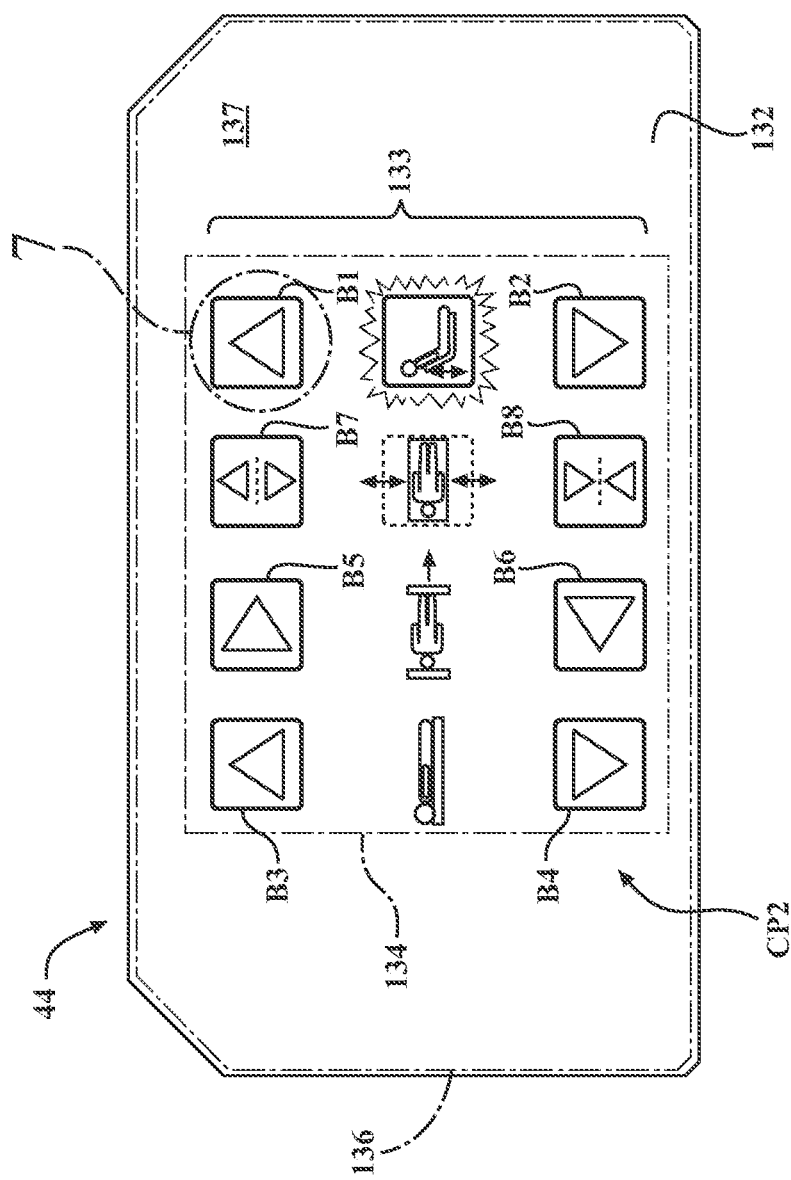
FIG. 5 is a front elevational view of a second control panel integrated into a sanitizable barrier wall of a side rail.

Referring to FIG. 5, in another embodiment, another control panel CP2 is shown integrated into the barrier wall 132. The control panel CP2 may be integrated into one of the side rails 44, 46, 48, 50, headboard 52, footboard 54, or any other component of the patient support apparatus 30. In FIG. 5, the control panel CP2 is shown integrated into the side rail 44. An end view of the side rail 44 is shown in FIG. 6.

The control panel CP2 comprises non-electronic indicia 133 disposed on the barrier wall 132. The indicia 133 is visible to the user and is located in a first region 134. The indicia 133 is shown fixed to an exterior surface 137 of the barrier wall 132. In one example, the indicia 133 comprises printed material on the exterior surface 137. In another embodiment, the indicia 133 is provided on a separate indicia layer (not shown) attached to the barrier wall 132. The indicia layer may comprise an adhesive backing to adhere to the barrier wall 132. The barrier wall 132 also comprises a second region 136 free of indicia adjacent the first region 134. In this embodiment, the exterior surface 137 is continuous between the first region 134 and the second region 136. The exterior surface 137 is also free of seams between the first region 134 and the second region 136. The barrier wall 132 may be formed of an electrically non-conductive material, such as plastic, wood, certain composites, and the like. The barrier wall 132 is formed of a material that can be easily sanitized to control the spread of infection. Furthermore, in the embodiments that lack joints/seams in the barrier wall 132 between the first region 134 and the second region 136, the exterior surface 137 can be easily wiped down with sanitizing wipes, etc. to inhibit the spread of infection.

The first region 134 and the second region 136 can be defined by portions or sections of the barrier wall 132, areas of the barrier wall 132, and the like. In the embodiment shown in FIG. 5, the first region 134 is defined as a first section of the barrier wall 132 delineated by a first outer boundary generally indicated by a first hidden line. The second region 136 is defined as a second section of the barrier wall 132 delineated between the first region 134 and a second outer boundary generally indicated by a second hidden line. In this embodiment, the second outer boundary also defines an outer periphery of the barrier wall 132 and an outer periphery of the side rail 44. The second outer boundary could also define an outer periphery of the headboard 52, footboard 54, or other component, depending on the location of the barrier wall 132.

The indicia 133 may comprise separate indicia B1-B8 associated with different predetermined functions of one or more of the powered devices 78-84. As users are generally accustomed to physical buttons that have symbols or other forms of indicia, the separate indicia B1-B8 may be similar in form to those conventionally used on push-button user interfaces. In this case, however, the ultrasonic generator system 120 (not shown in FIG. 5) provides haptic sensations to the user so that, even though the indicia B1-B8 is flat and devoid of tactilely significant surfaces, the user is given the impression that a physical button actually exists, such as a push-button. Thus, each separate indicia B1-B8 may be coincident with and indicative of the location of a separate virtual button.

The indicia B1 and B2 are associated with raising (B1) or lowering (B2) an angle of the fowler section of the patient support deck 38. The indicia B3 and B4 are associated with lifting (B1) or lowering (B2) the patient support surface 42 relative to the floor surface, respectively. The indicia B5 and B6 are associated with lengthening (B5) or shortening (B6) the bed length extension device 80 to lengthen or shorten the patient support apparatus 30 to accommodate taller or shorter patients. The indicia B7 and B8 are associated with widening (B7) or narrowing (B8) the bed width extension device 82 to widen or narrow the patient support apparatus 30 to accommodate larger or smaller patients, respectively. Other indicia, not shown, is also contemplated for use with other functions of the patient support apparatus 30.

Figure 7:
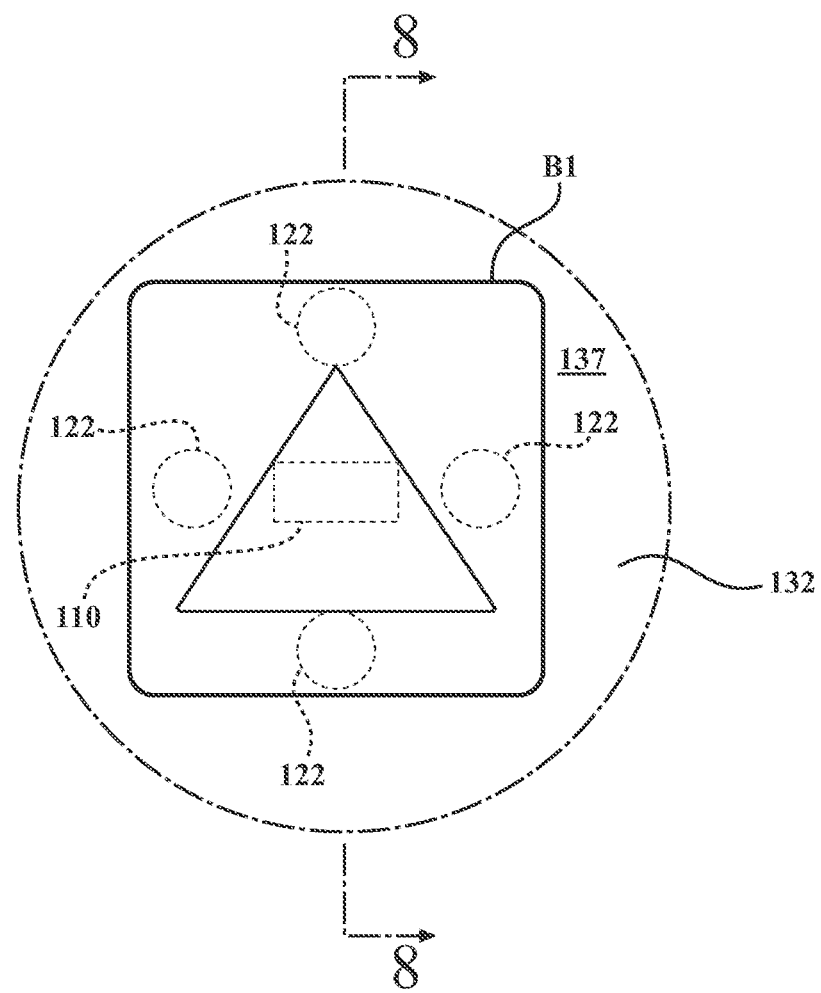
FIG. 7 is a blown-up view taken from FIG. 5 of indicia on the side rail.

Referring to FIG. 7, a close-up view of the indicia B1 is shown to illustrate the user input device 110 and ultrasonic elements 122 associated with each of the separate indicia B1-B8. As shown, a separate user input device 110 is associated with each of the separate indicia B1-B8 to transmit signals to the controller 102 associated with the function attributed to each of the separate indicia B1-B8. The user input devices 110 may be separate, integrated into a single unit, or combinations thereof. The separate indicia B1-B8 provide the user with a visual indication of the location of the separate user input devices 110.

Figure 8A:
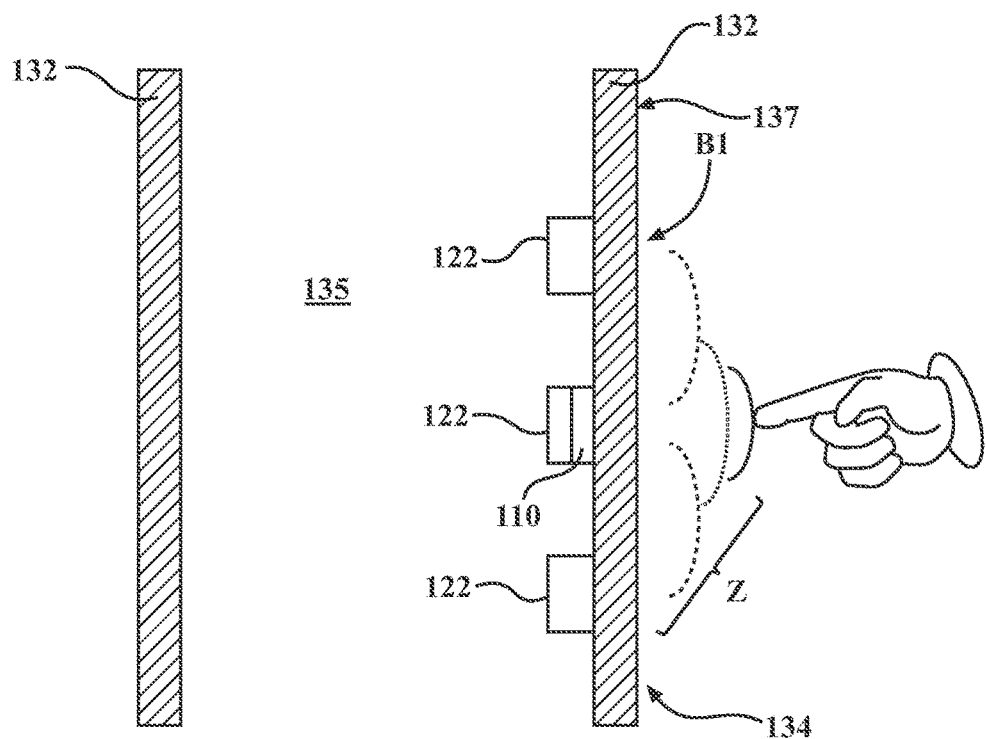
FIG. 8A is a cross-sectional view taken along the line 8-8 in FIG. 7 illustrating an ultrasonic generator system to provide haptic sensations.
Figure 8B:
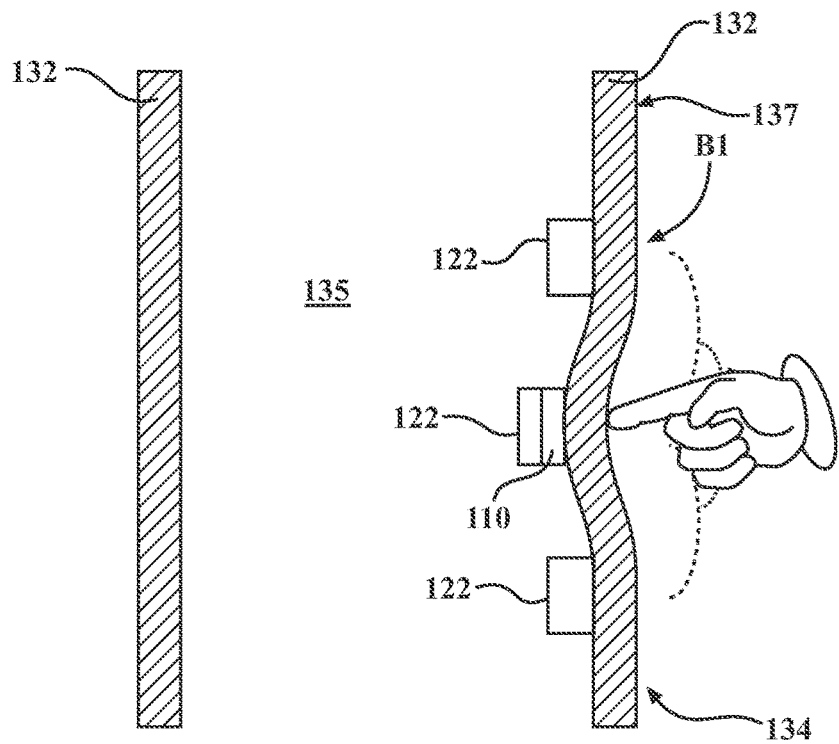
FIG. 8B is a cross-sectional view taken along the line 8-8 in FIG. 7 illustrating actuation of a sensor.

In the embodiment shown in FIGS. 8A and 8B, the separate indicia B1-B8 are located over their respective user input devices 110. In the embodiment shown, the separate user input devices 110 are located behind the barrier wall 132, beneath each of the separate indicia B1-B8 and thus, are not visible to the user. The user input devices 110 may also be embedded in the barrier wall 132.

The user input devices 110 are capable of sensing user input and providing associated input signals to the controller 102 without requiring direct contact by the user. This further simplifies the exterior surface 137 of the barrier wall 132, allowing the use of a continuous, seamless barrier wall 132 in some cases, further easing cleaning and sanitizing of the barrier wall 132. The user input devices 110 may be mounted to the barrier wall 132 to detect user input through the barrier wall 132 in the first region 134. The user input devices 110 may comprise, for instance, piezoelectric sensors that measure deflection or pressure on the barrier wall 132 without being directly contacted by the user. Other types of sensors may comprise pressure sensors, strain gauges, temperature sensors, optical sensors, and the like. Other types of sensors are also contemplated.

In other embodiments, one or more user input devices 110, such as one or more piezoelectric sensors, may be used in conjunction with two, three, or more of the indicia B1-B8. For example, four piezoelectric sensors could be located about the control panel CP2, with the controller 102 being able determine a location at which the user is applying pressure (e.g., which indicia B1-B8 is being contacted) based on relative signals from the various piezoelectric sensors. A single piezoelectric sensor could similarly be used for multiple indicia by utilizing signal strength as an indication of location.

One or more ultrasonic elements 122 are associated with each of the separate indicia B1-B8 to give the user the impression of a physical, raised surface (e.g., virtual button) protruding from the barrier wall 132 at each of the separate indicia B1-B8. For example, referring to FIG. 8A, the user's finger is shown receiving haptic sensations produced by the ultrasonic elements 122. The haptic sensations give the user the tactile sensation similar to an actual raised surface, but without requiring contact with the barrier wall 132. As the user continues to move their finger through the ultrasound waves toward the barrier wall 132, the user continues to receive the tactile sensation until the indicia B1 on the exterior surface 137 of the barrier wall 132 is reached. In some cases, the ultrasonic elements 122 continuously generate ultrasound waves to be felt by the user, but in other cases the ultrasonic elements 122 may be controlled to provide such ultrasound waves only in response to detecting proximity of a user (e.g., via a separate proximity sensor connected to the controller, etc.).

Once the user makes contact with the exterior surface 137 and applies a force to the barrier wall 132, the user input device 110 senses the force. In some cases, this can be through deflection of the barrier wall 132, as shown in FIG. 8B (deflection exaggerated for illustration). Owing to the connection between the user input device 110 and the controller 102, the controller 102 responds to sensing the user's applied force by performing the function desired by the user.

The user input devices 110 associated with the indicia B1 and B2, for instance, upon actuation, cause the controller 102 to energize the deck adjustment device 84 to articulate the fowler section of the patient support deck 38. The user input devices 110 associated with the indicia B3 and B4, upon actuation, cause the controller 102 to energize the lift device 78 to lift or lower the patient support surface 42 relative to the floor surface, respectively. The user input devices 110 associated with the indicia B5 and B6, upon actuation, cause the controller 102 to energize the bed length extension device 80 to lengthen or shorten the patient support apparatus 30 to accommodate taller or shorter patients. The user input devices 110 associated with the indicia B7 and B8, upon actuation, cause the controller 102 to energize the bed width extension device 82 to widen or narrow the patient support apparatus 30 to accommodate larger or smaller patients, respectively. Other user input devices, not shown, are contemplated for use with other indicia to perform other functions.

Still referring to FIGS. 8A and 8B, the barrier wall 132 defines an interior 135 generally isolated from the user between two barrier walls 132. It should be appreciated that, in some cases, the interior 135 is not completely inaccessible to the user or others, and may be accessed for service, cleaning, etc. On the other hand, the exterior surface 137 is exposed to the user and easily accessible to the user. In the embodiment shown, the user input devices 110 are disposed in the interior 135 such that the barrier walls 132 separate the user input devices 110 from the user in the first region 134 and separate the user input devices 110 from the exterior surface 137. Additionally, the ultrasonic elements 122 are disposed in the interior 135 such that the barrier walls 132 also separate the ultrasonic elements 122 from the user in the first region 134 and separate the ultrasonic elements 122 from the exterior surface 137. The user input devices 110 and/or ultrasonic elements 122 may be present in one or more separate layers attached to the barrier wall 132 in the interior 135 or may be mounted to the barrier wall 132 in other ways. In some cases, as described above, the user input devices 110 and/or the ultrasonic elements 122 may be embedded in the barrier wall 132. In this instance, the user input devices 110 and/or the ultrasonic elements 122 remain separated from the user and the exterior surface 137 by virtue of being located in the barrier wall 132. In some embodiments, the interior 135 may be defined by a single barrier wall 132. In this case, the user may be able to easily access the interior and the associated user input devices 110 and/or ultrasonic elements 122 located therein even though the barrier wall 132 separates them from the user and from the exterior surface 137 in the first region 134.

The first region 134 defines a user interaction zone of the user interface that comprises the control panel CP2. In embodiments where the user is able to perceive the presence of a virtual button above the barrier wall 132 without the user being required to contact the barrier wall 132, the sensation zone comprises a volume extending outwardly from the user interaction zone (e.g., outwardly from the first region 134) by a distance in which users can still perceive associated ultrasound waves. In some embodiments, owing to the barrier wall 132 being a smooth, generally flat surface in the first region 134, without any penetrations, seams/joints, etc., sanitizing of the user interaction zone is made easier and generally more effective than conventional user interaction zones that comprise undulating surfaces with penetrations, seams, and/or joints.

The barrier walls 132 may be configured to allow sufficient transmission of soundwaves therethrough. For instance, the barrier walls 132 may have suitable dimensions (e.g., thickness) that enable ultrasound wave transmission, may be formed of generally ultrasound wave transparent materials, and the like. The controller 102 is in communication with the ultrasonic elements 122 and is configured to control the ultrasonic elements 122 to produce ultrasound waves through the barrier wall 132 in the first region 134 to provide haptic sensations to the user. The controller 102 may also be located in the interior 135, or may be in communication with the user input devices 110 and the ultrasonic elements 122 through one of the barrier walls 132. In the embodiment shown in FIGS. 5, 6, 7, 8A, and 8B, the barrier walls 132 are free of any electronic visual displays in at least the first region 134, i.e., the user interaction zone. In other embodiments, one of the barrier walls 132 may be free of such electronic visual displays in the first region 134, while one or more electronic visual displays are located outside the first region 134, on the other barrier wall 132, or elsewhere.

In some cases, the tactile sensations may be different for each of the separate functions using the methods described above. In other words, the virtual buttons or other haptic sensations associated with each of the separate indicia B1-B8 may be different. As a result, the user is able to operate certain functions on the patient support apparatus 30 solely by feel if needed, thereby freeing the user's attention to focus on the patient or on other tasks. The controller 102 is also capable of virtually increasing or decreasing the size of the virtual button generated to accommodate different users or for different functions.

Figure 9:
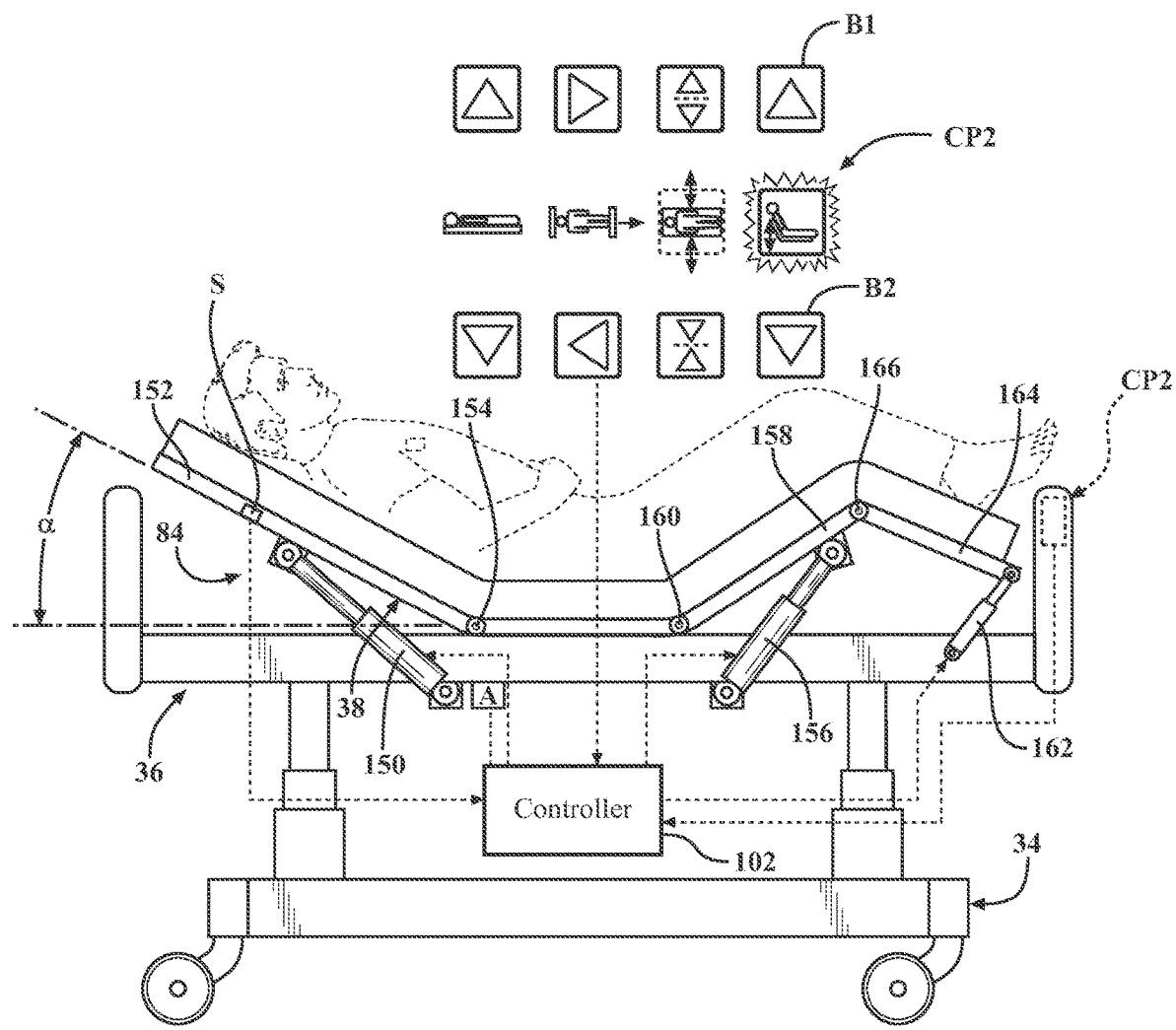
FIG. 9 is a right side elevational view of a patient support apparatus with articulating deck sections.

Referring to FIG. 9, the deck adjustment device 84 is configured to articulate the fowler section 152 of the patient support deck 38. The deck adjustment device 84 in the exemplary embodiment comprises a fowler actuator 150 coupled to the fowler section 152. The fowler actuator 150 moves the fowler section 152 relative to the intermediate frame 36. The fowler actuator 150 may comprise electric linear actuators that extend between the intermediate frame 36 and the fowler section 152. For example, as shown in FIG. 9, the fowler section 152 is pivotally connected to the intermediate frame 36 at a fixed pivot 154. The fowler actuator 150 has a first end pivotally connected to the intermediate frame 36 and a second end pivotally connected to the fowler section 152. Actuation of the fowler actuator 150 raises and lowers the fowler section 152 at various inclination angles relative to the intermediate frame 36. It is contemplated that any suitable deck adjustment system may be utilized in conjunction with the patient support apparatus 30. The deck adjustment device 84 also comprises a thigh actuator 156 to articulate the thigh section 158 about fixed pivot 160 and a foot actuator 162 to articulate the foot section 164 about moving pivot 166. Suitable electric linear actuators are supplied by LINAK A/S located at Smedevenget 8, Guderup, DK-6430, Nordborg, Denmark.

When a patient supported on the patient support apparatus 30 is connected to, or about to be connected to, a ventilator, caregivers should follow a protocol intended to reduce the likelihood of the patient acquiring ventilator associated pneumonia (VAP). While the specific protocol can vary, one protocol will customarily require that the articulation angle $\alpha$ of the fowler section 152 of the patient support apparatus 30 be maintained at or above a target angle, such as at or above thirty degrees, at or above forty-five degrees, in a range of from forty to forty-five degrees, or other ranges. The term target angle is understood to mean a discrete angle, a threshold angle, a range of angles, or combinations thereof. In some cases, the target angle may be set by the user or other person through a customization process via the control panel CP, for instance. A sensor S (shown attached to the fowler section 152), such as an accelerometer, a gravity sensor, a level sensor, or the like, may be provided in communication with the controller 102 so that the controller 102 is able to determine a current articulation angle $\alpha$ of the fowler section 152 relative to horizontal based on input signals from the sensor S. Other types of sensors may also be used. By keeping the patient's torso in an upright position, the likelihood of VAP is reduced.

As the user is raising or lowering the fowler section 152, the controller 102 continuously determines the current angle $\alpha$ of the fowler section 152 relative to horizontal, in substantially real-time, so that the controller 102 is able to provide real-time feedback to the user regarding the current angle $\alpha$. The controller 102 is then able to evaluate a relationship between the current angle $\alpha$ and the target angle. As a result, the user is able to discern how to move the fowler section 152 to meet the necessary protocol to reduce VAP. For instance, the feedback may indicate when the current angle $\alpha$ reaches the target angle or is above the target angle. The feedback may also indicate relationships between the current angle $\alpha$ and multiple target angles, e.g., by providing discrete feedback at or above each of two target angles, such as at or above thirty degrees and at or above forty-five degrees.

The feedback provided by the controller 102 may come in various forms. In certain embodiments, there is a desire that the feedback be provided in a manner that allows the user to continue watching and/or providing care to the patient without being distracted. Accordingly, in these embodiments, the feedback is non-visual feedback and could comprise audible feedback or haptic feedback (e.g., the tactile stimuli described above). In the case of audible feedback, an audible annunciator A (see also FIG. 2), such as a speaker attached to the intermediate frame 36, may be provided to provide an alert audible to the user that indicates when the fowler section 152 is at the target angle, below the target angle, above the target angle, or combinations thereof. For example, as the user is actuating a user input device (e.g., continuously pressing a push button, continuously touching a touchscreen input, or the like) to raise the fowler section 152 from a horizontal orientation, the controller 102 may generate, via the annunciator A, a sound indicating that the fowler section 152 has reached the target angle. Additionally, a series of sounds of differing characteristics could be generated to indicate that the current angle $\alpha$ is approaching the target angle culminating with a single, discrete sound when the target angle is reached. Other sound patterns, intensities, frequencies, etc. could be employed to provide an audible indication to the user associated with a relationship between the current angle $\alpha$ and the target angle. Sounds in the form of programmed voice/speech feedback could also be employed, e.g., the sound may state the current angle $\alpha$, e.g., "thirty degrees."

If haptic feedback is employed, in one embodiment, the array of ultrasonic elements 122 associated with the indicia B1 and/or B2 may be used to provide tactile stimuli to the user that indicates when the fowler section 152 is at the target angle, below the target angle, above the target angle, or combinations thereof. For example, as the user is actuating the user input device 110 associated with indicia B1 to raise the fowler section 152 from a horizontal orientation, the controller 102 may generate, via the ultrasonic generator system 120, tactile stimuli indicating that the fowler section 152 has reached the target angle. The tactile stimuli may comprise pulsing sensations caused by selectively activating/deactivating one or more of the ultrasonic elements 122, increasing the intensity of the ultrasound waves generated by one or more of the ultrasonic elements 122, or the like. Additionally, a series of different tactile stimuli or varying tactile stimuli (e.g., increasing intensity, increasing frequency of pulses, etc.) could be generated to indicate that the current angle $\alpha$ is approaching the target angle culminating with a discrete tactile stimulus generated when the target angle is reached. Other tactile stimuli patterns, intensities, frequencies, etc. could be employed to provide a haptic indication to the user associated with the target angle.

Furthermore, other types of haptic feedback generators can be used to generate haptic feedback. For instance, a motor with an eccentric rotating mass (e.g., eccentric motor E shown schematically in FIG. 2) in communication with the controller 102 could be activated by the controller 102 to provide vibrations, such as vibrations to the user input device 110. The motor E could be mounted to the same component of the patient support apparatus 30 as the user input device 110 controlling movement of the fowler section 152. Additionally, audible feedback may be combined with the haptic feedback in some embodiments. For instance, tactile stimuli may be used to indicate that the current angle $\alpha$ is approaching the target angle culminating with a single, discrete sound that indicates when the target angle has been reached.

Other forms of audible and/or haptic feedback may be used. For instance, actuation of the fowler actuator 150 may be modulated in a manner to indicate that the fowler section 152 is approaching the target angle, e.g., the controller 102 may slow operation of the fowler actuator 150 once the current angle $\alpha$ comes within a predefined threshold of the target angle. This slowdown may be linear or non-linear and can be felt by the user if the user's hand or other body part is in contact with the fowler section 152 or can be discerned by the user via the change in pitch/tone of the fowler actuator 150 during such a slowdown. The controller 102 may also modulate operation of the fowler actuator 150 to indicate that the current angle $\alpha$ is at the target angle, below the target angle, above the target angle, or combinations thereof. For instance, the controller 102 may pause operation of the fowler actuator 150 for a predetermined period of time when the target angle is reached.

In some cases, in order to continuously raise or lower the fowler section 152, continuous actuation of the user input device 110 is necessary. In other words, if the user ceases to actuate (e.g., press) the user input device 110, adjustment stops. In these cases, while the user continuously actuates the user input device 110, any form of audible and/or haptic feedback can be provided to the user. In other cases, such as when a single press or actuation of the user input device 110 starts continuous operation of the fowler actuator 150, then the controller 102 may additionally, or alternatively, stop operation of the fowler actuator 150 once the fowler section 152 reaches the target angle and then a second actuation of the user input device 110 restarts operation of the fowler actuator 150. Thus, the stop in operation provides a non-visual indication that the target angle has been reached as sound from the fowler actuator 150 ceases or the user feels that the fowler section 152 has stopped moving.

As described, various forms of audible and/or haptic feedback can be employed to indicate to the user the current state of the fowler section 152 as it relates to the target angle. In other embodiments, such feedback could also be employed to indicate states or conditions of other components of the patient support apparatus 30.

Figure 10:
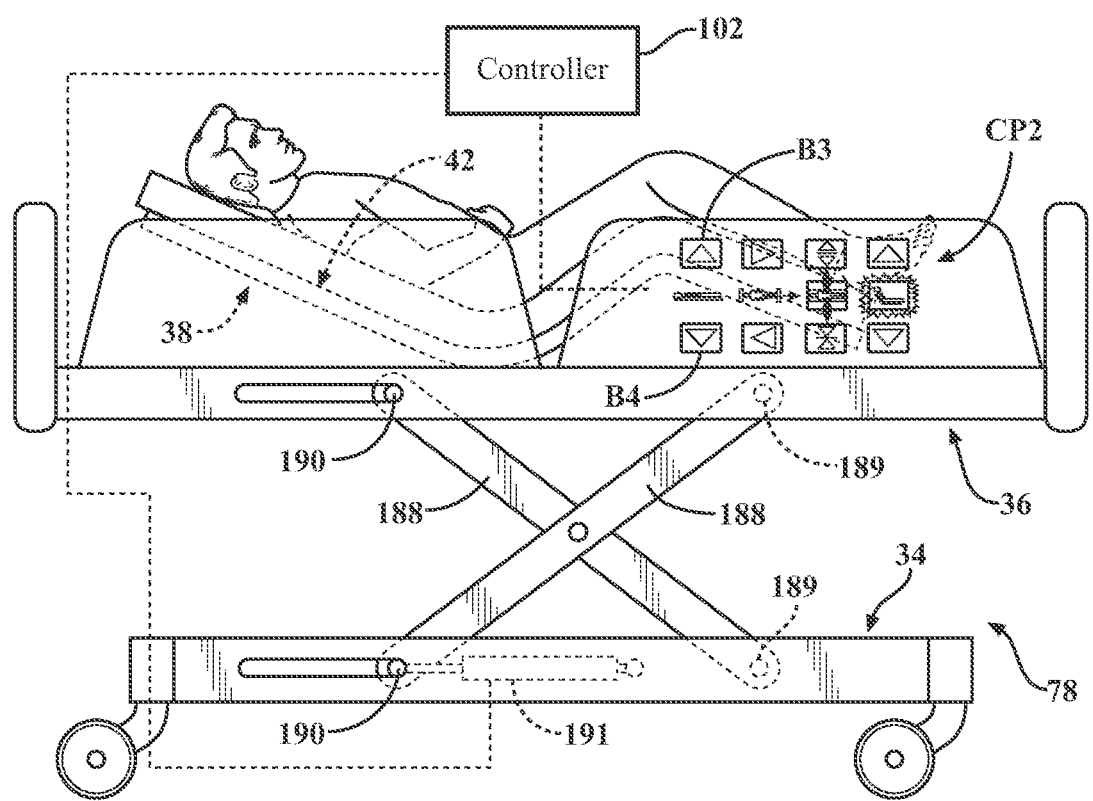
FIG. 10 is a right side elevational view of a patient support apparatus with lift device.

Referring to FIG. 10, an example of the lift device 78 is shown, which can also be operated using the control panel CP2 with its associated haptic feedback. The lift device 78 is configured to lift and lower the patient between the minimum and maximum heights of the patient support apparatus 30, and intermediate positions therebetween. The lift device 78 comprises a pair of lift arms 188 pivotally connected at a center thereof and arranged in a scissor-lift configuration. The lift arms 188 are movable to raise and lower the patient support surface 42 relative to the base 34 and the floor surface. Each of the lift arms 188 have a first end pivotally connected at a fixed pivot point 189 to one of the base 34 and the intermediate frame 36. The lift arms 188 extend from the first end to a second end. A pin 190 is fixed to the second end and arranged to slide in a horizontal guide slot defined in one of the base 34 and the intermediate frame 36.

An actuator 191 is fixed at one end to the base 34 and to one of the pins 190 at the other end. When actuated, the actuator 191 directly slides the pin 190 in the horizontal guide slot, which also indirectly slides the other pin 190 in the other horizontal guide slot, to raise and lower the patient support surface 42. The actuator 191 may comprise an electric linear actuator, a hydraulic cylinder, or similar driving mechanism. Suitable electric linear actuators are supplied by LINAK A/S located at Smedevenget 8, Guderup, DK-6430, Nordborg, Denmark. Other configurations of the lift device 78 are also possible, such as column lift mechanisms or linkage lift mechanisms as shown in FIGS. 1 and 9.

The controller 102 is configured to initiate operation of the lift device 78 in response to receiving input signals when the user actuates the user input devices 110 associated with the indicia B3 or B4 to operate the actuator 191 to either lift or lower the patient support surface 42. As the user is actuating the user input devices 110 associated with indicia B3 or B4, the controller 102 may generate, via the ultrasonic generator system 120 (or other haptic feedback system), tactile stimuli indicating that the patient support surface 42 has reached certain heights, e.g., an egress height, a treatment height, a transport height, a maximum height, a minimum height, etc.

Figure 11:
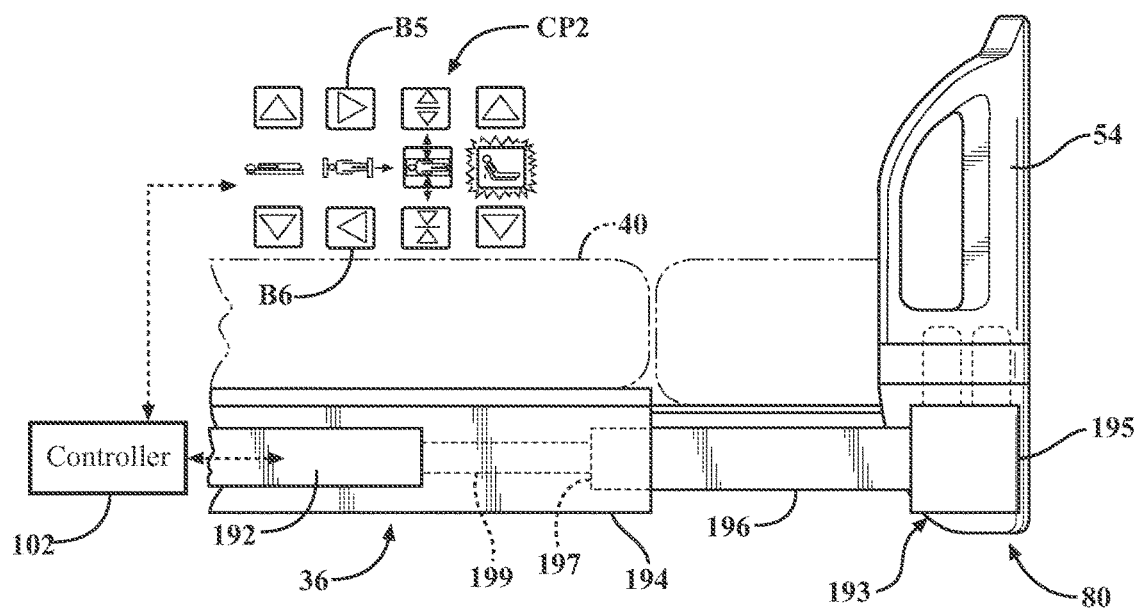
FIG. 11 is a partial elevational view of a bed length extension device.

Referring to FIG. 11, the bed length extension device 80 is configured to perform the function of adjusting a length of the patient support apparatus 30 to accommodate patients of greater than average height. In the exemplary embodiment, the bed length extension device 80 comprises a pair of actuators 192 (only one shown) to move a bed extension 193 between an unextended position and extended positions with respect to the intermediate frame 36. In some cases only one actuator is employed. In some embodiments, the bed extension 193 is movable from zero to at least twelve inches from the unextended position to a fully-extended position. In other embodiments, the bed extension 193 is able to move less or more than twelve inches and may be extendable to any position between the unextended and fully-extended position using the actuators 192. The bed extension 193 may have two, three, four, or nearly an infinite number of extended positions in which to be adjusted by the actuators 192.

The actuators 192 may comprise electric linear actuators. Suitable linear actuators are supplied by LINAK A/S located at Smedevenget 8, Guderup, DK-6430, Nordborg, Denmark. The bed extension 193 provides auxiliary support for the patient in the extended positions. In the version shown in FIG. 11, the bed extension 193 extends a foot end of the patient support apparatus 30 to accommodate patients of greater than average height. The footboard 54 is coupled to a carrier 195 of the bed extension 193. The footboard 54 moves with the bed extension 193 from the unextended position to the extended positions.

In the embodiment shown, the intermediate frame 36 comprises a pair of longitudinally oriented frame members 194 (only one shown). Legs 196 of the bed extension 193 are slidably and telescopically supported in the frame members 194. The legs 196 are attached to the carrier 195 of the bed extension 193. The legs 196 extend away from the carrier 195 to ends 197 disposed in the frame members 194. The ends 197 of the legs 196 are coupled to piston rods 199 of the actuators 192. The piston rods 199 are driven by the actuators 192 to extend and retract thereby pushing and pulling the legs 196 within the frame members 194 between the unextended and extended positions. Each of the frame members 194 have a hollow tubular shape with rectangular outer walls, e.g., rectangular tubing. In other embodiments, the frame members 194 may be cylindrical or other shapes or a single frame member may be employed. Various structures are contemplated to support the bed extension 193 during movement between the unextended position and the extended positions.

The controller 102 is configured to initiate operation of the bed length extension device 80 in response to receiving input signals when the user actuates the user input devices 110 associated with the indicia B5 or B6 to operate the actuators 192 to extend or retract the bed extension 193. As the user is actuating the user input devices 110 associated with indicia B5 or B6, the controller 102 may generate, via the ultrasonic generator system 120 (or other haptic feedback system), tactile stimuli indicating that bed extension 193 has reached certain lengths, e.g., a patient-specific length, a minimum length, a maximum length, each incremental length, a transport length, etc.

Figure 12:
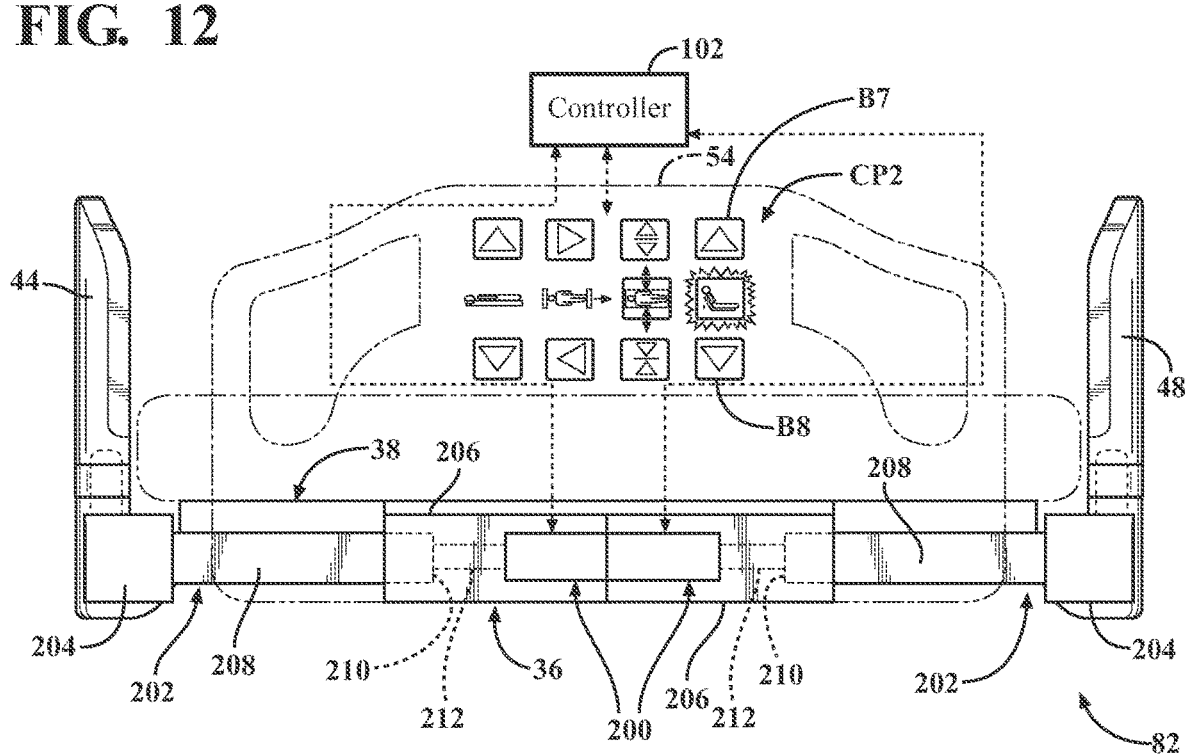
FIG. 12 is a partial elevational view of a bed width extension device.

Referring to FIG. 12, the bed width extension device 82 is configured to perform a function of adjusting a width of the patient support apparatus 30 to accommodate patients of greater than average width. The bed width extension device 82 may operate in the same manner as the bed length extension device 80. The bed width extension device 82 comprises two sets of actuators 200 (only one set shown) to move four bed extensions 202 (only two shown) between unextended and extended positions with respect to the intermediate frame 36. In some cases, only one actuator or one set of actuators is employed. In some embodiments, each of the bed extensions 202 is movable from zero to at least twelve inches from the unextended position to a fully-extended position. In other embodiments, each of the bed extensions 202 is able to move less or more than twelve inches and may be extendable to any position between the unextended and the fully extended position using the actuators 200. Each bed extension 202 has two, three, four, or nearly an infinite number of extended positions in which to be adjusted by the actuators 200.

The actuators 200 may comprise electric linear actuators. Suitable linear actuators are supplied by LINAK A/S located at Smedevenget 8, Guderup, DK-6430, Nordborg, Denmark. The bed extensions 202 provides auxiliary support for the patient in the extended positions. In the version shown in FIG. 12, the bed extension 202 extends a width of the patient support apparatus 30 to accommodate patients of greater than average width. Each of the side rails 44, 46, 48, 50 is coupled to one of the carriers 204 of the bed extensions 202. The side rails 44, 46, 48, 50 move with the bed extensions 202.

In the embodiment shown, the intermediate frame 36 comprises two pairs of laterally oriented frame members 206 (only one pair shown). Legs 208 of the bed extensions 202 are slidably and telescopically supported in the frame members 206. The legs 208 are attached to the carriers 204 of the bed extensions 202. The legs 208 extend away from the carriers 204 to ends 210 disposed in the frame members 206. The ends 210 of the legs 208 are coupled to piston rods 212 of the actuators 200. The piston rods 212 are driven by the actuators 200 to extend and retract thereby pushing and pulling the legs 208 within the frame members 206 between the unextended and extended positions. Each of the frame members 206 have a hollow tubular shape with rectangular outer walls, e.g., rectangular tubing. In other embodiments, the frame members 206 may be cylindrical or other shapes or a single frame member may be employed. Various structures are contemplated to support the bed extensions 202 during movement between the unextended position and the extended positions.

The controller 102 is configured to initiate operation of the bed width extension device 82 in response to receiving input signals when the user actuates the user input devices 110 associated with the indicia B7 or B8 to operate the actuators 200 to extend or retract the bed extensions 202. As the user is actuating the user input devices 110 associated with indicia B7 or B8, the controller 102 may generate, via the ultrasonic generator system 120 (or other haptic feedback system), tactile stimuli indicating that bed extensions 202 have reached certain widths, e.g., a patient-specific width, a minimum width, a maximum width, each incremental width, a transport width, etc.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support apparatus comprising:
   a base;
   a patient support deck supported by said base and comprising a deck section, wherein said patient support deck provides a patient support surface;
   an actuator operatively coupled to said deck section to articulate said deck section between articulation angles;
   a barrier wall supported by said base and comprising a first region free of any electronic visual displays, said barrier wall comprising an exposed exterior surface accessible to a user;
   a user input device disposed with respect to said barrier wall such that said first region of said barrier wall separates said user input device from said exposed exterior surface;
   an ultrasonic generator system disposed with respect to said barrier wall such that said first region of said barrier wall separates said ultrasonic generator system from said exposed exterior surface;
   a controller in communication with said ultrasonic generator system; and
   a sensor in communication with said controller and arranged to determine a current articulation angle of said deck section,
   said controller configured to control said ultrasonic generator system to generate haptic feedback in response to actuation of said user input device by the user to indicate to the user a relationship between said current articulation angle of said deck section and a target articulation angle.

2. The patient support apparatus of claim 1, comprising non-electronic indicia on said first region of said barrier wall, said non-electronic indicia being visible to the user.

3. The patient support apparatus of claim 2, wherein said non-electronic indicia is fixed to said exposed exterior surface.

4. The patient support apparatus of claim 3, wherein said non-electronic indicia comprises printed material on said exposed exterior surface.

5. The patient support apparatus of claim 2, wherein said barrier wall comprises a second region free of indicia adjacent to said first region and said exposed exterior surface is continuous between said first region and said second region.

6. The patient support apparatus of claim 5, wherein said exposed exterior surface is free of seams between said first region and said second region.

7. The patient support apparatus of claim 1, wherein said barrier wall is formed of an electrically non-conductive material.

8. The patient support apparatus of claim 1, wherein said user input device comprises a user input sensor mounted to said barrier wall to detect user input through said first region of said barrier wall, said controller configured to control said ultrasonic generator system to produce ultrasound waves through said first region of said barrier wall to provide haptic sensations to the user to define a virtual button.

9. The patient support apparatus of claim 8, wherein said user input sensor comprises a piezoelectric sensor.

10. The patient support apparatus of claim 8, wherein said user input sensor is embedded in said barrier wall.

11. The patient support apparatus of claim 1, wherein said barrier wall forms part of a side rail, a headboard, or a footboard.

12. The patient support apparatus of claim 1, wherein said ultrasonic generator system comprises an array of ultrasonic elements.

13. The patient support apparatus of claim 12, wherein said array of ultrasonic elements comprises ultrasonic transducers controlled by said controller to produce phased ultrasound waves to provide haptic sensations.

14. The patient support apparatus of claim 13, wherein said ultrasonic transducers are embedded in said barrier wall.

15. The patient support apparatus of claim 1, wherein said controller is configured to control said ultrasonic generator system to vary haptic sensations to the user.

16. The patient support apparatus of claim 1, wherein said controller is configured to control said ultrasonic generator system to provide informational haptic feedback to the user.

17. The patient support apparatus of claim 1, wherein said barrier wall defines an interior generally isolated from the user with said user input device and said ultrasonic generator system disposed in said interior.

* * * * *